United States Patent
Sperow (10) Patent No.: US 10,100,863 B2
(45) Date of Patent: Oct. 16, 2018

(54) EXTERNAL HEAT-STAKE ARRANGEMENT

(71) Applicant: GM GLOBAL TECHNOLOGY OPERATIONS LLC, Detroit, MI (US)

(72) Inventor: Travis Sperow, Davisburg, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 77 days.

(21) Appl. No.: 15/221,046

(22) Filed: Jul. 27, 2016

(65) Prior Publication Data

US 2018/0031022 A1   Feb. 1, 2018

(51) Int. Cl.
   *F16B 37/06* (2006.01)
   *F16B 19/08* (2006.01)

(52) U.S. Cl.
   CPC ............ *F16B 19/08* (2013.01); *F16B 37/068* (2013.01)

(58) Field of Classification Search
   CPC ...... F16B 37/061; F16B 37/068; F16B 5/045; F16B 19/04; B29C 66/8322
   USPC .......................... 411/171, 501, 526; 264/249
   See application file for complete search history.

(56) References Cited

U.S. PATENT DOCUMENTS

| | | | | |
|---|---|---|---|---|
| 2,431,238 A | * | 11/1947 | Friedman | B29C 65/56 242/118.7 |
| 3,027,609 A | * | 4/1962 | Parkin | A47B 95/04 403/283 |
| 3,820,579 A | * | 6/1974 | Barry | B23P 19/062 29/432 |
| 4,095,327 A | * | 6/1978 | Hartmann | B23P 19/062 29/509 |
| 4,780,039 A | * | 10/1988 | Hartman | E04D 3/3603 411/369 |
| 5,279,462 A | * | 1/1994 | Mehoudar | A01G 25/023 239/533.13 |
| 5,329,686 A | * | 7/1994 | Kildal | B29C 66/5346 264/249 |
| 6,637,095 B2 | * | 10/2003 | Stumpf | B29C 66/81423 156/293 |
| 6,727,612 B1 | * | 4/2004 | Hull | F16B 5/04 310/68 D |
| 7,070,378 B2 | | 7/2006 | Grabowski | |
| 7,207,762 B2 | * | 4/2007 | Teal | F16B 37/065 16/2.1 |
| 8,226,871 B2 | | 7/2012 | Salvador et al. | |

* cited by examiner

*Primary Examiner* — Flemming Saether (57) ABSTRACT

An external thermal heat-stake arrangement includes a polymeric base member having a collared heat-stake having an inner diameter and a second member disposed within the inner diameter of the collared heat-stake. The collared heat-stake is operatively configured to be deformed by a heated element to retain at least a portion of a peripheral edge of the second member to the polymeric base member.

1 Claim, 6 Drawing Sheets

EXTERNAL HEAT-STAKE ARRANGEMENT

TECHNICAL FIELD

The present disclosure pertains to the art of methods and apparatuses regarding the manufacture and assembly of plastic components, and more particularly to methods and apparatuses regarding the heat-staking of a metal or a plastic component such as the multi-prong retention component sold under the tradename PALNUT® (hereinafter to as "PALNUT®") polymeric base member.

BACKGROUND

Figure 1:
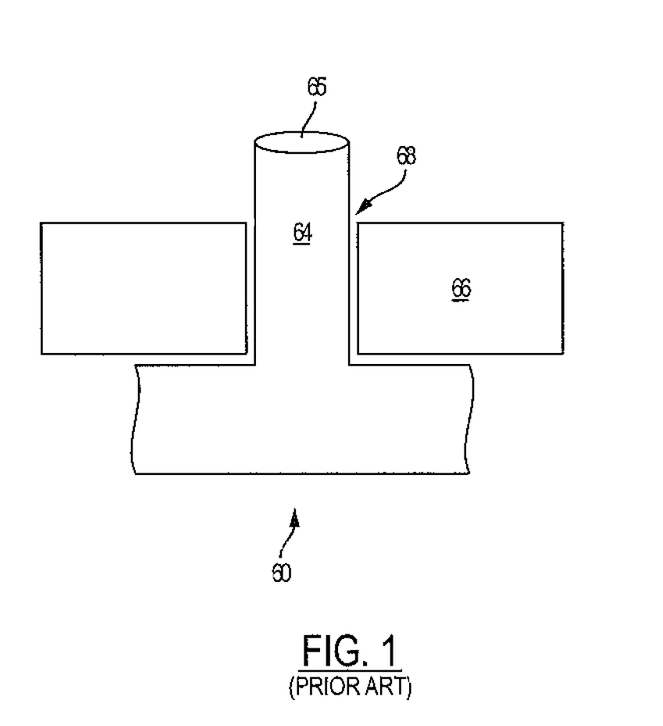
FIG. 1 is a traditional heat-stake and accompanying first and second members bdore heating according to the prior att.
Figure 2:
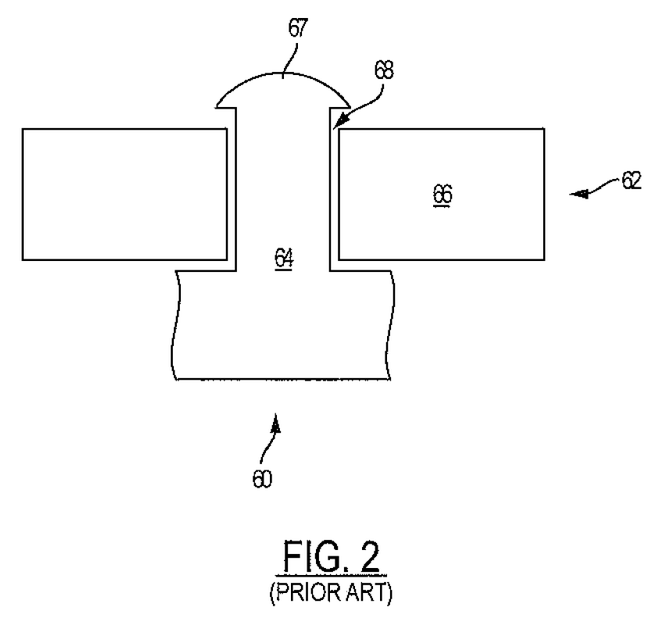
FIG. 2 is a traditional heat-stake and accompanying first and second members after heating according to the prior art.

With reference to FIGS. 1-2, it is known in the automotive industry to use a heat-staking process to join automotive parts. In one known application, a plurality of first thermoplastic components, commonly referred to as heat-stakes 64 may be provided, and a second automotive part 62 may comprise a plurality of second thermoplastic components, commonly referred to as a polymeric base member 66, defining a receiving hole 68 for each heat-stake 64. The receiving holes 68 may be located in corresponding locations to the heat-stakes of the first automotive part 60. The heat-stakes 64 may be inserted into the receiving holes 68 of the corresponding polymeric base members 66 and a staking device (not shown) may be used to heat-treat a leading end 65 of each heat-stake 64. This use of the staking device results in the deformation of the heated leading end of the heat-stake such that a "mushroom cap" 67 may be formed. The mushroom cap 67 of each heat-stake 64 commonly covers the corresponding receiving hole 68 of the polymeric base member 66. This resulting overlap results in the mechanical coupling of the first and second automotive parts 60, 62, It is known that the resulting retention force of any heat-staking process may be dependent upon the amount of surface area of the polymeric base member 66 contacted by the heat-stake's mushroom cap 67 as well as the composition states of the polymeric base member 66 and heat-stake 64. By "retention force" it is meant the force required to separate, break, or undo the mechanical coupling created by the heat-staking process.

Although many known methods of heat-staking work well for their intended purposes, various disadvantages exist. One disadvantage relates to the fastening surface of the polymeric base member available to contact the mushroom cap of the heat-stake. Commonly the fastening surface available is relatively small. Additionally, the process of heating the leading end of the heat-stake may further reduce the amount of fastening area. When a polymeric base member is comprised of a softer composition than that of the heat-stake, the small amount of surface area available for the heat-stake's mushroom head to contact may be insufficient to achieve a high retention force. Often, the heat from the heat-staking process tends to melt some of the polymeric base member's softer material. This melting may create a loose condition that may further reduce retention force.

What is needed, therefore, is a heat-staking process that increases retention force by increasing the amount of fastening area available to contact with the heat-stakes' mushroom cap while also increasing the retention characteristics of the polymeric base member.

SUMMARY

According to one embodiment of this present disclosure, a method comprises the steps of: providing a thermoplastic polymeric base member comprising at least a first opening and an heat-stake collar where the collar may or may not be continuous; inserting a PALNUT® (or a second member) within an inner diameter within the heat-stake collar; heating the heat-stake collar; and, deforming a first end of the heat-stake collar to overlap or surround at least part of the PALNUT® (or the second member).

According to one embodiment of this present disclosure, a vehicle comprises a first automotive part and a second automotive part. The first automotive part may be a polymeric base member having a first opening defined by an heat-stake collar. The heat-stake collar may or may not be continuous. The second automotive part may be a metal component such as a PALNUT® or a polymeric component. The PALNUT® is received within the first opening of the first automotive part such that the PALNUT® is disposed at a lower base within the heat-stake collar. The heat-stake collar has a first end and a second end. The second end of the heat-stake collar may be a closed end or an open end. Where the metal component is provided in the form of a PALNUT® or the like, the second end of the polymeric base component is open.

When the first end of the heat-stake collar is heated, the first end of the heat-stake collar deforms to at least partially cover the periphery of the PALNUT® or second member and to form a mechanical coupling of the first member to the second member.

One advantage of the present disclosure is that the external heat-stake of the present disclosure provides an increased retention force for the mechanical coupling of the first member to the second member.

Another advantage of the present disclosure is that the retention component/PALNUT® or second member may be comprised of a different composition than that of either the polymeric base member or the external heat-stake. This allows a person of skill in the art to choose the specific composition of the retention component based on a variety of factors and considerations, such as required retention force and cost, specific to any one application.

Still another advantage of this present disclosure is that the retention component or second member optimizes the load transfer between the second member and the first member (or polymeric base member). The configuration and arrangement allows this load to be spread over a greater surface area than conventional heat-stake methods.

Still other benefits and advantages of the present disclosure will become apparent to those skilled in the art to which it pertains upon a reading and understanding of the following detailed specification.

BRIEF DESCRIPTION OF THE DRAWINGS

The present disclosure may take physical form in certain parts and arrangement of parts, embodiments of which will be described in detail in this specification and illustrated in the accompanying drawings which form a part hereof and wherein.

DETAILED DESCRIPTION

The exemplary embodiments described herein provide detail for illustrative purposes, and are subject to many variations in composition, structure, and design. It should be emphasized, however, that the present disclosure is not limited to a particular arrangement as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein are for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items.

Figure 3:
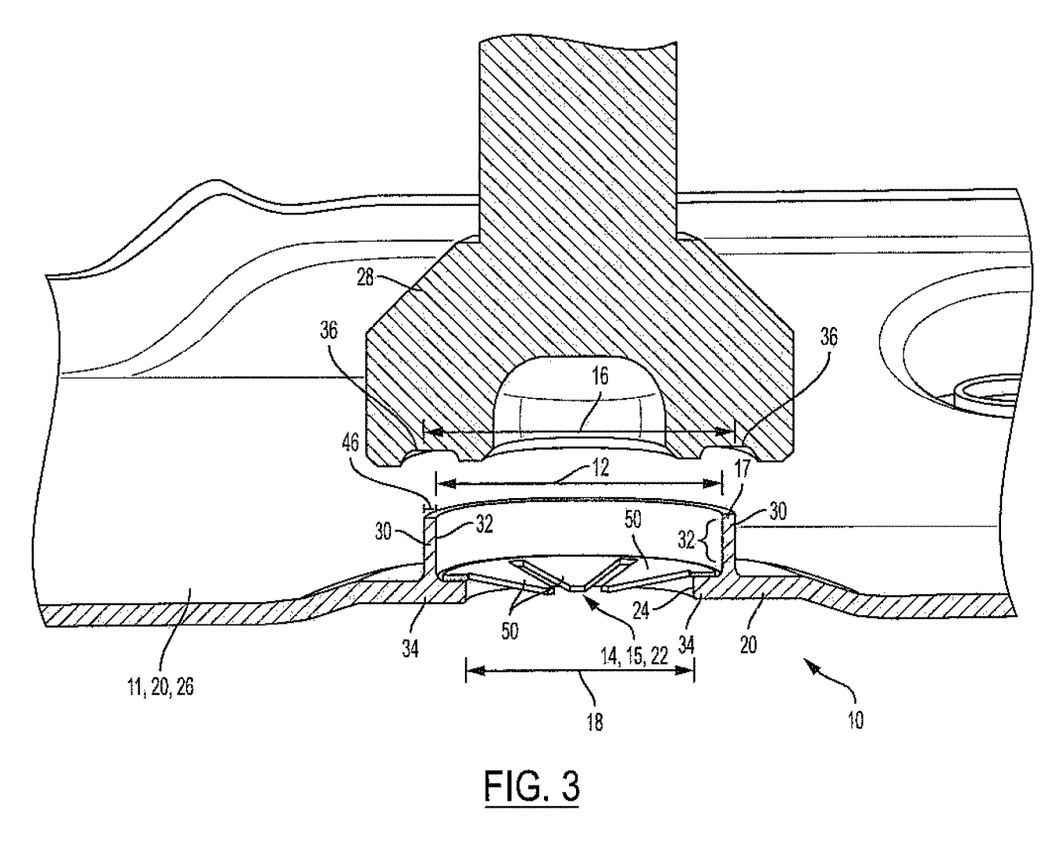
FIG. 3 is an external collared heat-stake and accompanying first and second members before heating according to one embodiment of the present disclosure.

Referring now to the drawings wherein the drawings are for purposes of illustrating embodiments of the present disclosure only and not for purposes of limiting the same, FIG. 3 shows an external heat-stake arrangement 10 comprising an external heat-stake 30, and a polymeric base member 20 as well as second member 14 (shown as PAL-NUT® 15) which may be formed from metal or a polymeric material. According to one embodiment of the present disclosure, the external heat-stake 30 may include a base portion 34, a first end 17, a second end 42, and a shaft portion 32. Shaft portion 32 may be positioned substantially perpendicular to base portion 34. The angle of shaft portion 32 relative to base portion 34 is not intended to limit the present disclosure as other useful angles will become apparent to persons of ordinary skill in the art. The external heat-stake 30 may be formed of a rigid plastic material such as a polypropylene, nylon, or Acrylnitril-Butadien_Styrol-Copolymere (ABS) or any similar material chosen with sound engineering judgment. It will be appreciated that the present disclosure is not limited by the type of material, and that the present disclosure can be practiced with any suitable deformable material that can allow the user to stake the external heat-stake 30 in a uniform and consistent manner. The term "stake" is generally applied to a staking operation that includes any one of a plurality of fastening methods known in the art, such as conventional welding, ultrasonic welding, and hot staking.

Figure 4:
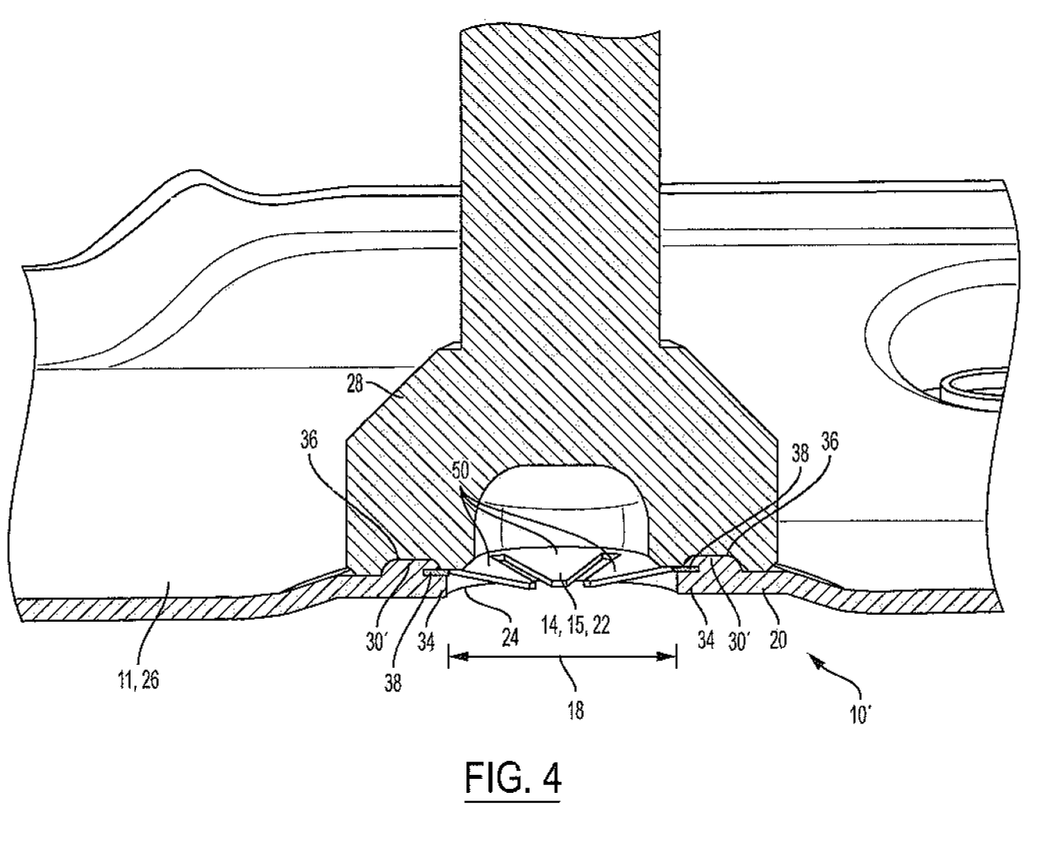
FIG. 4 is an external collared heat-stake and accompanying first and second members during the heat-staking process according to one embodiment of the present disclosure.
Figure 5:
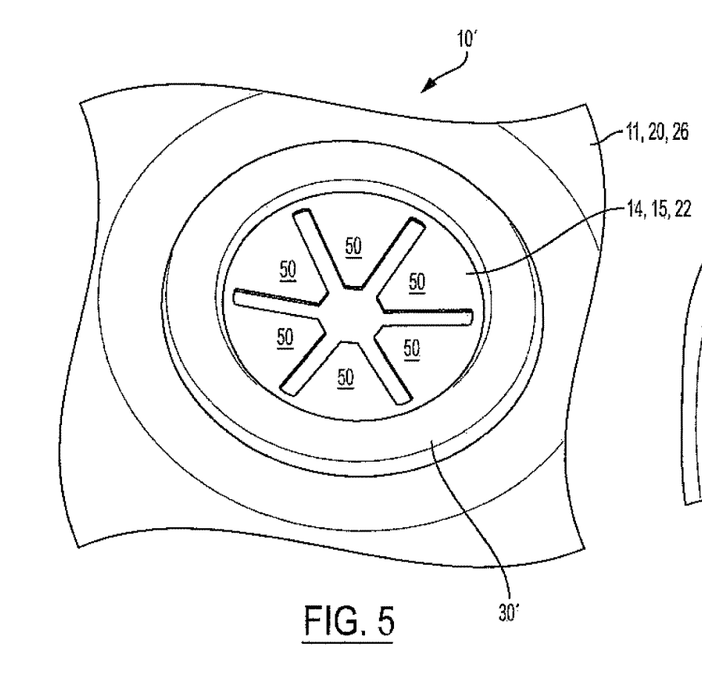
FIG. 5 is a plan view of the external heat-stake arrangement after the heating process according to one embodiment of the present disclosure.
Figure 6:
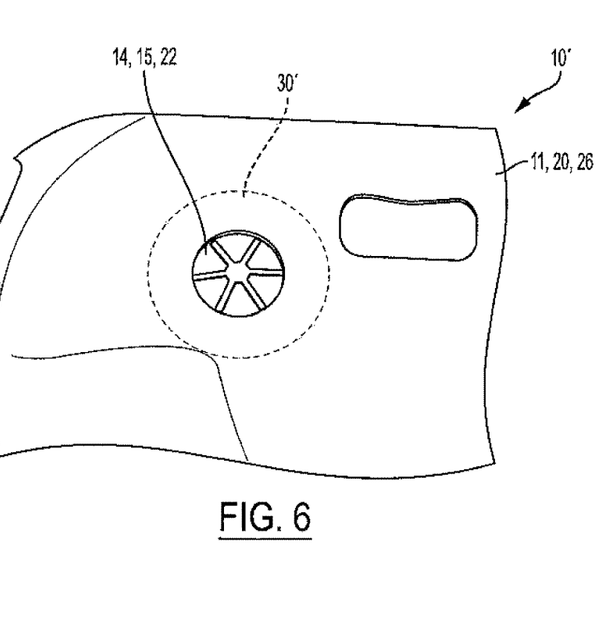
FIG. 6 is a plan view of the first member having the external heat-stake arrangement at various points according to one embodiment of the present disclosure.

With reference now to FIGS. 3-5, the polymeric base member 20 may, but not necessarily, define a polymeric base member central passage 24 upon which an opening may provided so that retention component 22 or second member 14 may be accessed. In one embodiment, the polymeric base member 20 may be formed of a different material than that used to form external heat-stake 30 (via a two shot injection molding process or the like), or may be formed from the same material as that used to form external heat-stake 30. The polymeric base member 20 may be formed of a material that is softer than that used to form external heat-stake 30 or one that has a lower melting point. The hardness of a material may be determined by determining the material's indentation hardness, the size of an indention made by an indention tool under a fixed load, or any other method chosen with sound engineering judgment. A material's melting point may be determined by any known method for determining melting point. Similarly, the composition of the polymeric base member 20 can be varied with respect to the composition of the external heat-stake 30 based on properties such as hardness, apparent melting point, etc.

Figure 7:
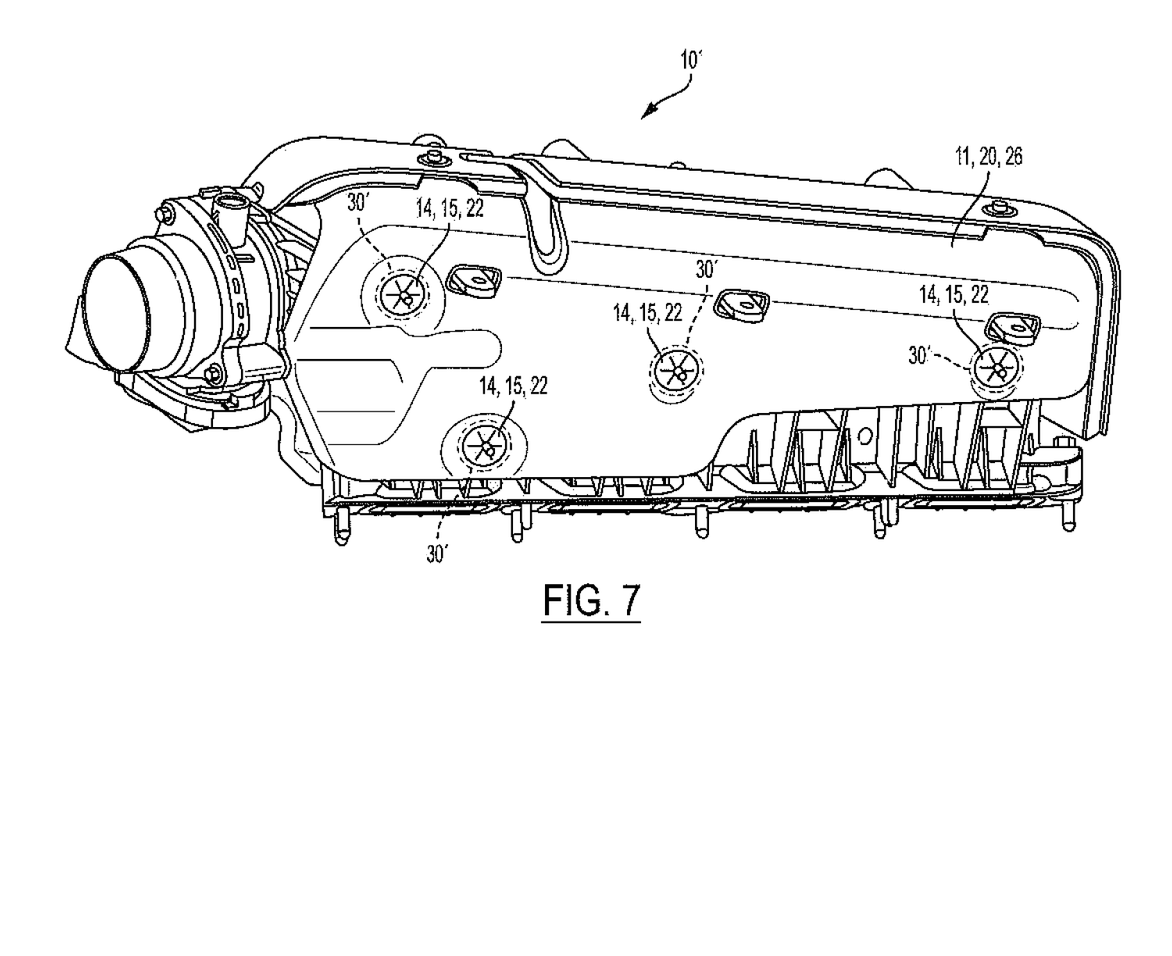
FIG. 7 is a perspective view of a first member (shown as a cover) having a plurality of second members heat-staked to the first member.

With continuing reference to FIGS. 3-5, the retention component 22 may at least partially encircle, surround, or overlap with central passage 24. Other embodiments may comprise the retention component 22 substantially encircling, surrounding, blocking or overlapping with the polymeric base member central passage 24 such that the retention component 22 is substantially aligned with the polymeric base member central passage 24 such that a maximum area of the external heat-stake 30 may engage with the peripheral edge 38 of the retention component 22. This allows for the retention component 22 to become part of the polymeric base member 20 during the manufacturing process for base member 20 thereby preventing potential loss of retention components 22 downstream in the manufacturing process. Moreover, by heat-staking or staking retention components 22 to base member 20 when (or soon after the base member 20 is manufactured), the overall assembly time for the system is decreased given that the step of individually mounting loose retention components 22 to base member 20 is no longer necessary in the downstream process. Greater accuracy in the assembly process is also achieved in that retention components 22 which are heat-staked into base member serve as a visual identifier to an assembly line worker or robot to secure the base member at the retention component locations as shown in FIG. 7.

The retention component 22 (or second member 14) may further include a retention means 26 of varying configurations such as, but not limited to the example of prongs 52 of a PALNUT® 15 shown in FIGS. 3-5. Retention component 22 may come in the form of other members such as a cover or a reinforcement disc (not shown), The aforementioned retention components 22 are merely non-limiting examples for the purposes of the present disclosure wherein heat-stake is provided in the form of an upstanding collar. The heat-stake 30 provided in FIGS. 3-5 may be in the form of a circle, a square or other section. It is also understood that the section does not have to be continuous. Rather, the heat-stake secures a retention component 22 in multiple locations about the peripheral area 38 of retention component 22.

With respect to the prongs 52 of the PALNUT® 15 shown in FIGS. 3-5, the prongs are operatively configured to receive and retain a shaft or material of an adjacent component within the prongs of a PALNUT® 15. With reference to FIG. 5, the PALNUTS® 15 that are heat-staked on the base member 20 are operatively configured to engage withy insulating fabric (not shown) for the engine. The base member shown in FIG. 5 so that the base member 20 (shown as a cover 26) may hold insulating material/fabric adjacent to the cover 26.

The polymeric base member 20 may be formed of a rigid plastic material such as a polypropylene, nylon, or Acrylnitril-Butadien_Styrol-Copolymere (ABS) or any similar material chosen with sound engineering judgment. In one embodiment, the retention component 22 may be formed of a different material than that used to form the polymeric base member 20. The retention component 22 may be formed of a harder material than that used to form polymeric base member 20. The retention component 22 may be attached to polymeric base member 20 by the heat-staking process disclosed in the present disclosure.

With continuing reference to FIG. 3 which shows the retention component 22 disposed within the collared external heat-stake 30 prior to the heat-staking process. The retention component 22 may overlap with the base portion 34 of collared external heat-stake 30. Moreover, as shown, the base portion 34 of the heat-stake may be integral to the polymeric base member 20 and may be operatively configured to support retention component 22 in the polymeric base member 20 prior to the heat-staking process and/or after the heat-staking process. It is understood that after the heat-staking process the peripheral area of the retention component 22 maybe sandwiched between the deformed external heat-stake 30' and base portion 34.

The shaft portion 32 of the external heat-stake 30 (shown in FIG. 3) may have an interior diameter opening of D1 (shown as element 12 in FIG. 3), that is less than the component passage outer diameter D2, shown as 16 in FIG. 3. The polymeric base member opening 24 may have an inner diameter opening D3, shown as element 18 FIG. 3, that is greater than the less than the diameter of both D1 and D2 so that base portion 34 of polymeric base member may support retention member 22.

The cylindrical shape of the shaft portion 32 of external heat-stake 30, base portion 34 of heat-stake, and the retention component 22 are not intended to limit the scope of the present disclosure and any shape, chosen with sound engineering judgment, may be used. Therefore, it is understood that shaft portion 32 of external heat-stake 30 may or may not be a continuous external heat-stake 30 as shown. Rather, the external heat-stake 30 need only, at a bare minimum, surround the periphery of the polymeric base central passage 24.

With reference again to FIG. 3, the staking operation may be performed by inserting the retention component 22 inside of the shaft portion of the external heat-stake 30 as shown. Heating element 28 may be used to heat up and deform the external heat-stake 30 so that the heating element 28 is positioned above the collared external heat-stake 30 and pushed into the collared external heat-stake 30 so that that the heating element 28 melts and deforms the collared external heat-stake 30 as shown in FIG. 4 In one embodiment, the retention component 22 may be attached to the polymeric base member 20 by an over-molding process. In another embodiment, the retention component 22 may be attached to the polymeric base member 20 through a co-injection molding process.

As indicated earlier, the leading end 36 of heating element 28 may then be pushed against the first end 17 of the external collared heat-stake 30 such that the deformed collared external heat-stake 30' secures the retention component 22 between the deformed external heat-stake 30' and the base portion 34 of the external collared heat-stake 30.

In one embodiment, a shaping device (not shown) may first be heated and then applied to the central portion 38 of shaft portion 32 about (heated) leading end 36 of external heat-stake 30. The shaping device may transfer heat to the external heat-stake 30 thereby softening the shaft portion 32 while substantially simultaneously shaping the shaft portion 32 to form a deformed portion 40. The heat may be applied in the form of hot air or any other known method chosen with sound engineering judgment. The deformed external heat-stake 30' may comprise a flattened ring shape, or may have a cross section of a mushroom-cap shape or any other shape that enables the mechanical coupling of deformed external heat-stake 30', retention component 22, and polymeric base member 20.

Inherent characteristics that may contribute to the resulting shape of deformed portion 40 include the material used to comprise external heat-stake 30 as well as thickness 46 of the collared external heat-stake 30. The collared external heat-stake 30 may be of sufficient thickness 46 such that the deformed collared external heat-stake 30' has an overall width or deformed thickness 46' that is substantially larger than the initial thickness 46. Accordingly, any load between the deformed collared external heat-stake 30' and the retention member 22 is evenly distributed over the increased area of the deformed collared external heat-stake 30'.

Accordingly, the collared external heat-stake 30 thickness 46 may fall within a wide range of thicknesses within sound engineering judgment. However, such thickness 46 must be sufficient to allow the collared external heat-stake 30 to be deformed and redistributed over the peripheral area of the retention component 22 as shown in FIG. 4. Accordingly, the deformed collared external heat-stake 30' applies a substantially uniform and continuous pressure to at least a peripheral portion 38 of the retention component 22 and base portion 34 of the collared heat-stake thereby providing an external heat-stake arrangement 10 for subsequent additional assembly.

Various embodiments have been described, hereinabove. It will be apparent to those skilled in the art that the above methods and apparatuses may incorporate changes and modifications without departing from the general scope of this present disclosure. It is intended to include all such modifications and alterations in so far as they come within the scope of the appended claims or the equivalents thereof.

10 external heat—stake arrangement
11 First Member
12 Inner Diameter
14 second member
15 palnut
16 outer diameter
17 first end of heat—stake collar
18 D3
20 polymeric base member
22 retention component
24 polymeric base central passage
26 cover
28 heating element
30 external heat stake—upstanding collar
30' deformed external heat—stake
32 shaft portion external heat stake
34 base portion—heat stake
36 leading end of heating element
38 peripheral area
40 lower base—collared heat stake
42 second end
44 first opening
46 initial thickness
46' deformed thickness
50 retention means
52 prongs

What is claimed is:

1. An external thermal heat-stake arrangement comprising:
- a polymeric base member including a collared heat-stake having an inner diameter, an outer diameter, and a thickness in between the inner and outer diameters; and
- a retention component disposed within the inner diameter of the collared heat-stake wherein the collared heat-stake is operatively configured to be deformed by a heated element to retain a peripheral edge of the retention component to the polymeric base member;
- wherein the polymeric base member further includes a base portion for the collared heat-stake and the retention component is a PALNUT®.

* * * * *